United States Patent
Banerjee et al.

(10) Patent No.: US 10,326,638 B2
(45) Date of Patent: Jun. 18, 2019

(54) IMPLEMENTING AN ENERGY PROPORTIONAL NETWORK ARCHITECTURE FROM DESIRED NETWORK CRITERIA

(75) Inventors: Sujata Banerjee, Palo Alto, CA (US); Joseph P. Chabarek, Madison, WI (US); Puneet Sharma, Palo Alto, CA (US); Jayaram Mudigonda, Los Altos, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 970 days.

(21) Appl. No.: 14/351,258

(22) PCT Filed: Oct. 31, 2011

(86) PCT No.: PCT/US2011/058678
§ 371 (c)(1),
(2), (4) Date: Apr. 11, 2014

(87) PCT Pub. No.: WO2013/066307
PCT Pub. Date: May 10, 2013

(65) Prior Publication Data
US 2014/0258498 A1    Sep. 11, 2014

(51) Int. Cl.
*H04L 12/12*     (2006.01)
*H04L 12/24*     (2006.01)
*H04L 12/931*    (2013.01)

(52) U.S. Cl.
CPC .............. *H04L 41/04* (2013.01); *H04L 12/12* (2013.01); *H04L 41/0833* (2013.01);
(Continued)

(58) Field of Classification Search
None
See application file for complete search history.

(56) References Cited

U.S. PATENT DOCUMENTS

2007/0214105 A1*   9/2007  Sfarti ................. H04L 67/1097
2008/0285562 A1*  11/2008  Scott ................. G06F 15/17362
                                                              370/392
(Continued)

FOREIGN PATENT DOCUMENTS

WO    WO-2011124236 A1 * 10/2011 ............. H04L 45/00

OTHER PUBLICATIONS

Abts, et al., "Energy Proportional Datacenter Networks," Process International Syposium on Computer Architecture (ISCA), Jun. 19-23, 2010, pp. 338-347, vol. 38, Issue 3, USA.
(Continued)

*Primary Examiner* — Mohamed A. Wasel
*Assistant Examiner* — Tsung Y Wu
(74) *Attorney, Agent, or Firm* — Brooks, Cameron & Huebsch, PLLC

(57) ABSTRACT

Systems, methods, and computer-readable executable instructions are provided for implementing an energy proportional network architecture. Implementing an energy proportional network architecture can include determining a number of desired network criteria and a desired number of access ports. A number of switches for the energy proportional network architecture can be calculated from the desired number of access ports and the number of desired network criteria. Implementing an energy proportional network architecture can also include using the number of calculated switches to form the energy proportional network.

19 Claims, 4 Drawing Sheets

(52) U.S. Cl.
CPC ............ *H04L 41/145* (2013.01); *H04L 49/35* (2013.01); *Y02D 50/40* (2018.01)

(56) References Cited

U.S. PATENT DOCUMENTS

| | | | |
|---|---|---|---|
| 2009/0106529 | A1 | 4/2009 | Abts et al. |
| 2011/0161695 | A1 | 6/2011 | Okita et al. |
| 2011/0176804 | A1 | 7/2011 | Biinkert et al. |
| 2011/0243032 | A1 | 10/2011 | Jenne et al. |
| 2012/0140637 | A1* | 6/2012 | Dudkowski ............ H04L 45/00 370/238 |
| 2013/0070754 | A1* | 3/2013 | Iovanna ................ H04L 45/00 370/351 |

OTHER PUBLICATIONS

Chabarek, et al., "Power Awareness in Network Design and Routing," Proceedings of Infocom, Apr. 2008, 9 pages, USA.

Extended European Search Report received in EP Application No. 11875125.4 dated May 6, 2015—11 pages.

Guo, et al., "BCube: A High Performance, Server-centric Network Architecture for Modular Data Centers," ACM SIGCOMM, Aug. 2009, 12 pages.

Hall, "Tiny Switch Could Shrink Computers/Microscopic machines with the power of a billion PCs" Jul. 16, 1999, 2 pages.

Heller, et al., "Elastic Tree: Saving Energy in Data Center Networks," NSDI, Apr. 2010, 12 pages, California, USA.

International Search Report and Written Opinion received in PCT Application No. PCT/US2011/058678, dated Jul. 31, 2012, pp. 9.

Lanzisera, et al., "Data Network Equipment Energy Use and Savings Potential in Buildings," ACEEE Summer Study on Energy Efficiency in Buildings, Jun. 2010, 13 pages.

Mahadevan, et al., "A Power Benchmarking Framework for Network Devices," Process IFIP Networking, May 2009, 14 pages, California, USA.

Mahadevan, et al., "Energy Proportionality of an Enterprise Network," First ACM SIGCOMM Workshop on Green Networking, Aug. 2010, 7 pages, California, USA.

Mahadevan, et al., "Engergy Aware Network Operations," Global Internet Symposium, May 2009, 6 pages.

Mahadevan, et al., "Reducing Lifecycle Energy Use of Network Switches," International Symposium Sustainable Systems and Technology (ISSST), May 2010, 6 pages.

Nedevschi, et al., "Reducing Network Energy Consumption via Sleeping and Rate-Adaptation," Proceedings of NSDI, Apr. 2008, 14 pages.

P. Mahadevan et al. "On energy efficiency for enterprise and data center networks", IEEE Communi cat ions Magazine, vol. 49, issue 8, pp. 94-100, Aug. 2011 See pp. 96-98.

Priya Mahadevan, On energy efficiency for enterprise and data center networks, Ieee communications magazine, Ieee service center, Aug. 1, 2011, pp. 94-100, vol. 49, No. 8, USA.

Vasic, et al., "Responsive, Engergy-proportional Networks," Jan. 2011, 12 pages, Switzerland.

International Preliminary Report on Patentability received for PCT Patent Application No. PCT/US2011/058678, dated May 15, 2014, 6 pages.

"IEEE 802.3az: Energy Efficient Ethernet", Task Force Update, Presented to the P802.3ba Task Force, Jul. 16, 2008, 19 pages.

* cited by examiner

IMPLEMENTING AN ENERGY PROPORTIONAL NETWORK ARCHITECTURE FROM DESIRED NETWORK CRITERIA

CROSS-REFERENCE TO RELATED APPLICATIONS

This application claims priority to International Application No. PCT/US11/58678 filed on Oct. 31, 2011. The contents of which are incorporated herein by reference in its entirety.

BACKGROUND

Many network designs and deployments are designed as hub and spoke architectures. These hub and spoke architectures can include access ports for computing devices that can be connected to a closest switching hub. Network components (e.g., access ports, interconnection ports, linecards, and/or switches) can always be turned on and/or enabled, irrespective of the existence of traffic generating or receiving data. Networks can also utilize a few switches with large radix values and may be unable to achieve energy proportionality due to the inability in current designs to turn off the backplane portions incrementally in a load proportional manner.

DETAILED DESCRIPTION

Figure 1:
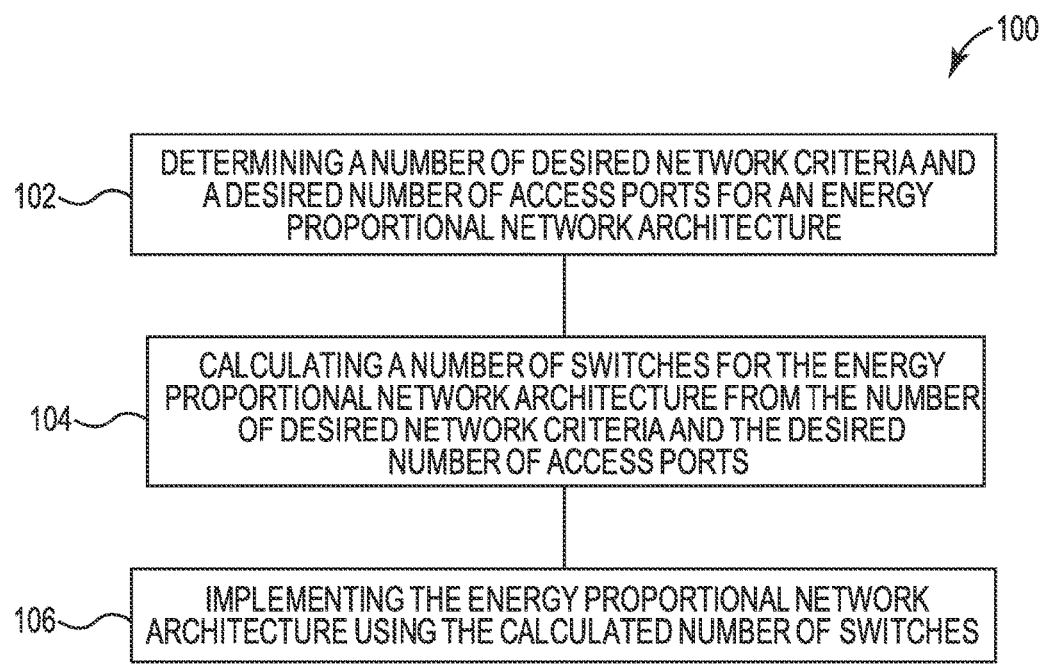
FIG. 1 is a flow chart illustrating an example method for implementing an energy proportional network architecture, according to the present disclosure.

Examples of the present disclosure can include methods, systems, and computer-readable executable instructions and/or logic. An example method for implementing an energy proportional network architecture can include determining a number of desired network criteria and a desired number of access ports and calculating a number and type of switches and connectivity amongst these switches for the energy proportional network architecture from the number of desired network criteria and the desired number of access ports. An example method for implementing an energy proportional network architecture can also include implementing the energy proportional network architecture using the calculated number of switches.

As generally described herein, an energy proportional network architecture can include, but is not limited to, a network architecture that utilizes energy in proportion to an amount of traffic, load, and/or number of active ports. Desired network criteria can refer to criteria specifying various features of a network architecture, such as, for example, a size of the network, the type and number of switches in the network, and so on.

In the following detailed description of the present disclosure, reference is made to the accompanying drawings that form a part hereof, and in which is shown by way of illustration how examples of the disclosure can be practiced. These examples are described in sufficient detail to enable those of ordinary skill in the art to practice the examples of this disclosure, and it is to be understood that other examples may be utilized and that process, electrical, and/or structural changes can be made without departing from the scope of the present disclosure. The examples herein can be implemented in various applications (e.g., data centers, networks, local area networks (LAN), Wi-Fi access ports, enterprise networks, among others).

Network switches are computer networking components that connect network segments. Network switches can have access ports (e.g., Ethernet ports, WLAN ports, etc.) to allow connected devices to connect to a network. For example, a computer may be connected via an Ethernet port to a router to access the internet. Network switches can also have interconnection ports to allow the switches to connect to other switches. The size of a switch, which can be represented by the number of ports on the switch, can vary according to the type of switch. The number of ports on the switch can be represented by its radix value. For example, switches can range from approximately one to 10 ports per switch (e.g., "tiny" switches, radix value<=10) while other switches can have from 10 to hundreds of ports per switch (e.g., "large" switches, radix value>10).

The ports of a network switch can also allow computing devices to directly communicate with each other. For example, if four example devices A, B, C, and D, are all connected to the same network switch S, then the four example devices can communicate with one another through the switch. For example, example device A can be able to communicate with example device D, and example device B can be able to simultaneously communicate with example device C. In contrast, for example, if example device E is connected to a different network switch, example device E may not be able to directly communicate with example devices A-D. Example device E can connect to example devices A-D through a network server and/or a different switch, but may not be able to directly intercommunicate. For this reason, when determining networking architectures, a number of devices expected to connect to an individual switch can be considered, thus giving all the devices connected to the switch the ability to directly intercommunicate.

A network architecture can comprise the design of a communications network (e.g., network, local area network (LAN), data center). That is, the network architecture can comprise a network topology and the types of switches (radix, interface types, interface bandwidths, features such as Power over Ethernet, etc.) utilized in the communications network. The network topology can be the layout pattern of interconnections of the various elements utilized in the communications network. The architecture supports the specific network performance and connectivity criteria.

Access ports for various devices can be connected to a closest switching hub for a particular location. The hub switches can be interconnected amongst themselves to provide complete reachability, as well as ingress/egress to Internet and data centers hosting various enterprise services. A hub and spoke network architecture can have redundancy at an access level to account for link and switch failures. To prevent link and switch failures that cause interruptions for users, the number of ports can be increased to account for failures. For example, a network criteria can require 20 access ports to accommodate the number of users for the network, but it can be determined that 30 access ports should be implemented in the network to account for port failure and/or future expansion. The number of access ports per switch can be increased in order to allow more devices to intercommunicate with other devices connected to a single switch. For example, if two devices are connected to the same switch, the two devices can be able to directly intercommunicate with each other through just one switch and with a low network latency and high bandwidth. Network latency can be a time delay experienced in a communications network. The increased number of access ports and intercommunication between devices connected to the switch can be accomplished by using a single switch with an increased number of access ports. For example, it can be decided that 100 access ports are desired in a network to meet the network criteria, and in response, a single large switch with 100 access ports can be used.

A single switch can use a particular amount of energy even if there is no traffic through the switch. For example, even if there is no traffic through the switch, the interconnection backplane of the switch can still be running along with, a processor, a power supply, and/or a fan, which can require a particular amount of energy (e.g., a minimum amount of energy). Further, the devices (e.g., backplane, processor, power supply, fan) can require a particular amount of energy when there is an increased amount of traffic through the switch. The switch can be turned off when there is no traffic through the switch, but turning off the switch may not be desired for some applications. For example, if the single switch is turned off, there is a latency to enable the switch and restore network access to the applications when required.

On a single switch, management software, turning off individual ports, and/or turning off linecards can be utilized to conserve energy; however, these techniques can have poor energy proportionality to the amount of traffic that is occurring through the switch. For example, even if there is no traffic through the switch, the switch can still be using energy when it is turned on and/or enabled. Thus, even though particular ports or linecards are disabled and/or turned off, many of the components of the switch can still be using energy.

By utilizing a number of interconnected switches in a number of locations to replace a single large switch, a network manager (e.g., person controlling the network, software, hardware) can have increased (finer grained) control over energy consumption of the network and can achieve increased energy proportionality. For example, as noted above, switches with a smaller number of ports per switch can require decreased energy. In another example, when a number of interconnected switches have a particular traffic level (e.g., a maximum allowable traffic) or a particular number of active ports, a particular number of switches (e.g., all the switches) can be turned on and/or be enabled to accommodate an increased traffic rate. If the traffic decreases, a number of the switches can be disabled and/or turned off, and a different number of the switches can be enabled to conserve energy. If there is no traffic through the interconnected switches, then nearly all of the switches can be disabled, with consideration for applications that cannot wait for the network to turn-on.

For example, if there is no traffic moving through the number of interconnected switches, all but a particular number of switches (e.g., one or two of the switches to enable critical applications to access the network instantly when needed) can be disabled, which can save energy (e.g., electricity). In another example, if a decreased number of the switches with small ports per switch (radix) value are enabled, the energy consumption can be decreased proportionally when traffic is decreased. By utilizing a number of interconnected switches, energy proportionality can be reached by disabling a number of the interconnected switches (and ports) and enabling a number of interconnected switches based on the network architecture traffic. Energy proportionality can include, but is not limited to, utilizing energy in proportion to an amount of traffic, load, and/or number of active ports.

FIG. 1 is a flow chart illustrating an example of a method 100 for implementing an energy proportional network architecture, according to the present disclosure. Method 100 can implement an energy proportional network architecture (e.g., a network of "tiny" switches (NoTS)) with a number of switches with relatively low radix values. For example, if a network criteria requires 80 access ports, instead of using a single switch with 80 access ports or two switches with 40 access ports and a number of interconnection ports, 40 "tiny" switches can be interconnected with 2 access ports per switch and a number of interconnection ports.

A network can be designed with multiple smaller switches that can be interconnected through a number of interconnection ports to replace a single large switch. The power can be turned off for a number of the switches of the network. This can conserve energy needed to run a backplane and other applications of the individual switches. For example, if it is determined that the network requires 100 access ports, 25 interconnected switches with 4 access ports per switch and a number of interconnection ports can be used. The 25 switches can be interconnected to replace a single switch (with 100 access ports) through the number of interconnection ports. For example, if the 25 switches, each with four access ports and a number of interconnection ports providing the requisite bandwidth to meet the network performance criteria are connected by Ethernet cables via the number of interconnection ports, they can act as a single switch with 100 access ports and thus meet the desired network criteria. These interconnection ports are used along with an aggregation switch to interconnect the smaller switches. Further, an increased number of switches (e.g., all 25 switches) can be enabled when the traffic is relatively high through the switches. When traffic decreases, a number of switches can be disabled, and a decreased number of switches can be enabled (e.g., enable 15 switches).

In another example, if the flow of traffic stops completely, an increased number of switches can be disabled, and a decreased number of switches can be enabled (e.g., only enable one switch). This can allow the network to continue operations while using energy to power requisite switches with a decreased port per switch (radix) value. If only the single 100-port switch is used, the backplane of the switch with some other components such as the fan and processor, can remain on, even if a number of ports and linecards are turned off when demand is reduced. The backplane energy consumption of the number of interconnected switches can also be determined. Determining the backplane energy of the number of interconnected switches can help determine a number of switches to disable. For example, if particular individual switches within the number of interconnected switches have higher backplane energy, it can be beneficial to disable these individual switches at a particular time (e.g., before disabling switches with lower backplane energy).

At 102, the desired network criteria and the desired number of access ports for the energy proportional network architecture are determined. Network criteria can vary based on a number of factors including, but not limited to, size of the network, number of users, capital to invest in the network, network capacity, concentration of users at specific times, the desired type of each of the number of switches in the energy proportional network architecture, the desired number of bandwidth criteria, the desired redundancy and usage patterns of the energy proportional network architecture and/or necessity of the network to users.

At 104, the number and type of switches for the energy proportional network architecture is calculated from the desired number of access ports and the network criteria. The desired number of access ports can be based on the desired network criteria. For example, if it is determined from the desired network criteria that the network requires 100 ports and 10 devices with the ability to directly interconnect at a given bandwidth, a calculation indicating that one of the switches can have 12 ports to accommodate the 10 devices that need to directly intercommunicate, leaving 2 extra ports in the event of port or link failure and/or future expansion. Further it may be determined that other switches require 4 ports per switch. Based on this determination, the switch system may need one switch comprising 12 ports per switch with a number of interconnection ports and 22 switches with 4 ports per switch with a number of interconnection ports per switch. All of the interconnected switches can have different radix values or ports per switch values, depending on the network criteria.

A particular number of switches (e.g., a highest number) that implements a particular number of access ports that meets desired network criteria can be determined. For example, if no devices need to directly communicate, a number of switches with a particular number (e.g., a lowest number) of access ports per switch value can be utilized in order to have a particular number (e.g., the highest number) of switches. Utilizing an increased number of switches can have energy conserving benefits while maintaining network criteria. For example, switches with a smaller number of ports can use less energy than switches with a larger number of ports per switch. Individual settings of the multiple switches can be utilized to dynamically scale the backplane to accommodate a current traffic flow through the switches.

A difference in energy consumption between switches with different ports per switch numbers can be attributed to, but not limited to, the size of the processor, backplane energy, fan size, and/or power supply size. Switches with a small number of ports may not have features available to switches with a large number of ports, including features such as, for example: VLAN, Spanning Tree, link aggregation, PoE supply, SNMP or other management functionality, intelligent forwarding capacity, and/or other features. It can be determined if any of the features are required for the network; the determination can be considered when deciding on the type of switches to utilize.

At 106, the energy proportional network architecture is implemented using the calculated number of switches. Implementing the network can include, but is not limited to, connecting the devices to the network, turning the power on, checking the devices and the communication through the network, checking network capabilities, and determining the locations to implement the energy proportional network with the calculated number of switches.

Implementing the energy proportional network architecture can include replacing an existing network architecture. For example, it can be desirable to replace an existing single switch (e.g., edge switch, core switch) with a set of interconnected switches. In the example, the total number of ports for the interconnected switches can be determined from the number of ports on the single switch that is being replaced by the set of interconnected switches. After the number of ports on the single switch that is being replaced is determined it can be desirable to determine a greater number of ports for the interconnected switches to replace the single switch. Prior use of direct intercommunication between devices can also be considered on different switches within the network to determine a switch to replace. For example, if a single switch is being utilized by a network that is not often used for direct intercommunication between devices connected to the switch, that switch can be a candidate for replacing with a set of interconnected switches. At this point a number of locations can be determined, based on the desired network criteria, to selectively replace the portions of existing network with an energy proportional network (e.g. NoTS architecture)

Determining the location to implement the calculated number of switches can include implementing the desired network criteria to determine how many locations can be converted to an energy proportional network architecture (e.g., NoTS architecture). As described above, the desired network criteria can include, but is not limited to, size of the network, number of users, capital to invest in the network, network capacity, concentration of users at specific times, the desired type of each of the number of switches in the energy proportional network, the desired number of bandwidth criteria, the desired redundancy and usage patterns, and/or necessity of the network to users. Based on the network criteria, locations (e.g., location of a single switch, location of a plurality of interconnected switches acting as a single switch, location of a plurality of switches) within the existing network architecture can be determined for implementation of the NoTS architecture. The locations selected can implement the NoTS architecture into the existing network architecture while retaining the current performance (e.g., bandwidth, data throughput, connect time, network criteria) and reliability (e.g., accounting for switch failures) of the existing network architecture.

Figure 2:
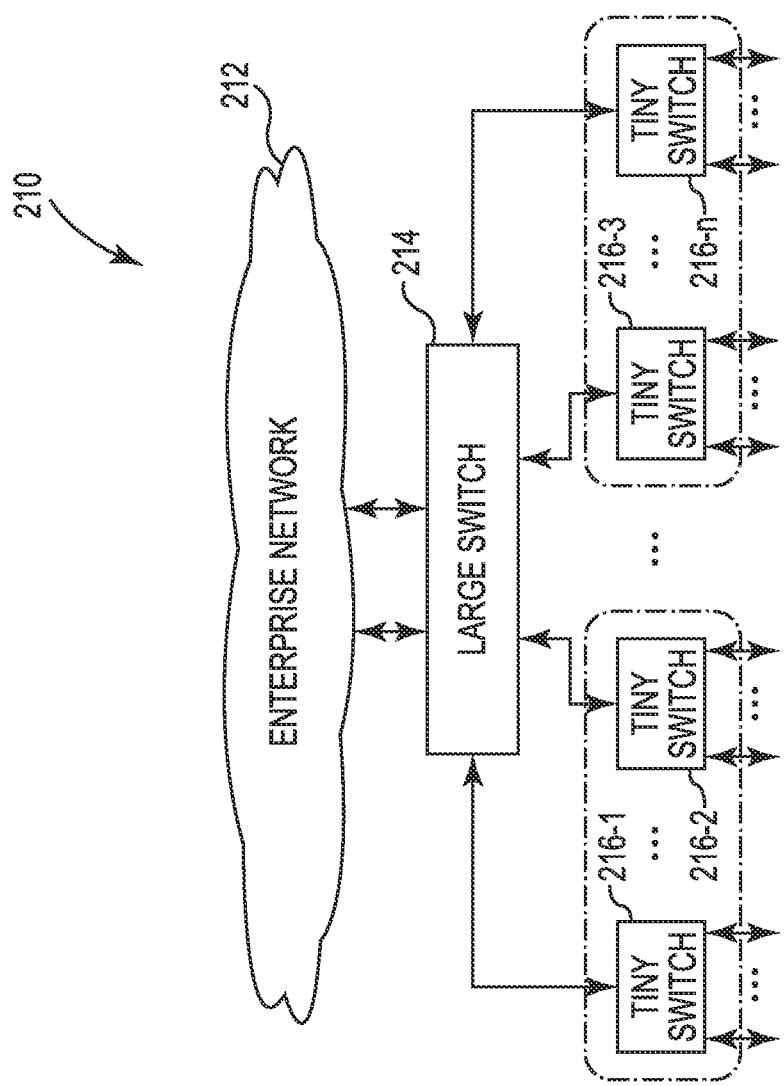
FIG. 2 illustrates an example network architecture, according to the present disclosure.

FIG. 2 illustrates an example network architecture 210, according to the present disclosure. Network architecture 210 can include a number of "tiny" switches 216-1, 216-2, 216-3, . . . , 216-N, which are switches with a particular radix value range (e.g., 1 to 10 access ports per switch). In some examples, the network architecture can be a NoTS architecture. Switches 216-1, 216-2, 216-3, . . . , 216-N can be interconnected to act as a single switch, with the number of access ports equaling the total number of access ports of all the switches 216-1, 216-2, 216-3, . . . , 216-N. The switches 216-1, 216-2, 216-3, . . . , 216-N can also contain a number of interconnection ports for interconnecting the switches 216-1, 216-2, 216-3, . . . , 216-N. The radix values of the switches 216-1, 216-2, 216-3, . . . , 216-N are not limited to a single value for each switch or to a single type for each switch. Switches 216-1, 216-2, 216-3, . . . , 216-N can be disabled when it is determined that network traffic through the interconnected switches 216-1, 216-2, 216-3, . . . , 216-N is running below a threshold capacity (e.g., full capacity) or certain ports are not active. For example, during a time period when a decreased number of users is accessing the network, it can be determined that the number of switches 216-1, 216-2, 216-3, . . . , 216-N should be disabled in order to conserve energy. It can also be determined that the number of interconnected switches 216-1, 216-2, 216-3, . . . , 216-N should be enabled. For example, if traffic is increased through the switches 216-1, 216-2, 216-3, . . . , 216-N, then it can be determined that the number of interconnected switches 216-1, 216-2, 216-3, . . . , 216-N should be enabled to correspond to the increase in traffic through the switches.

A switch (e.g., a "large" switch) 214 can be included in the network architecture 210. For example, the number of interconnected switches 216-1, 216-2, 216-3, . . . , 216-N can send the traffic from the switches 216-1, 216-2, 216-3, . . . , 216-N to a switch 214, which can have a greater radix value than the switches 216-1, 216-2, 216-3, . . . , 216-N. Switch 214 may not be an element of the network architecture. For example, the number of interconnected switches 216-1, 216-2, 216-3, . . . , 216-N can directly send the traffic to the enterprise network 212. Network architecture 210 can also be implemented by replacing switch 214 with the number of interconnected switches 216-1, 216-2, 216-3, . . . , 216-N. For example, the number of interconnected switches 216-1, 216-2, 216-3, . . . , 216-N can send traffic to a different set of interconnected tiny switches that send the traffic to the enterprise network 212. The network architecture 210 can also be implemented by a switch 214 sending traffic to a set of interconnected "tiny" switches 216-1, 216-2, 216-3, . . . , 216-N, wherein the set of interconnected switches 216-1, 216-2, 216-3, . . . , 216-N send the traffic to enterprise network 212.

Enterprise network 212 can be connected to switch 214 that is connected to interconnected switches 216-1, 216-2, 216-3, . . . , 216-N, as part of network architecture 210. Network architecture 210 (e.g., a NoTS network architecture, energy proportional architecture) can be implemented in a number of ways. For example, switch 214 can be replaced by a set of interconnected switches 216-1, 216-2, 216-3, . . . , 216-N, and the interconnected switches 216-1, 216-2, 216-3, . . . , 216-N can be replaced by switch 214, wherein the switch 214 sends traffic to the interconnected switches 216-1, 216-2, 216-3, . . . , 216-N. The interconnected switches 216-1, 216-2, 216-3, . . . , 216-N can further send the traffic to enterprise network 212. The examples of FIG. 2 can be implemented in a number of combinations based on, for example, the network criteria and/or desires of a network manager and/or user.

Figure 3:
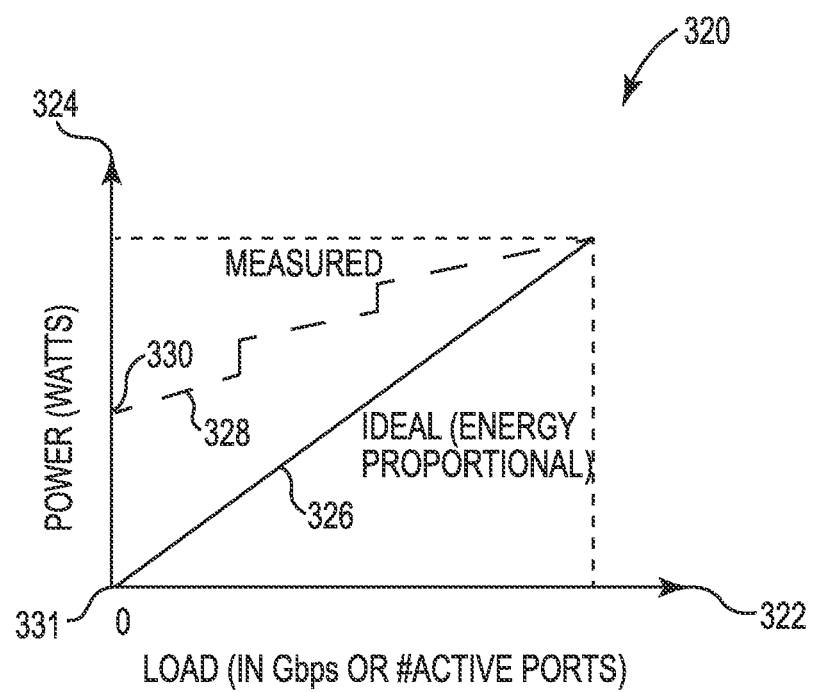
FIG. 3 illustrates an example graph of energy proportionality, according to the present disclosure.

FIG. 3 illustrates an example graph 320 of energy proportionality, according to the present disclosure. Graph 320 can represent the energy required to run a network switch compared to the load or traffic that flows through the switch.

An amount of energy, in watts, is shown on the y-axis 324 of graph 320. The x-axis 322 represents the amount of load that is traveling through the switch in Gigabytes per second (Gbps) and/or the number of active ports. At zero (e.g., point 331), there is no load traveling through the switch and no energy is used to enable the switch.

Line 328 can represent a "large" switch, which can be a single switch with a large number of ports. As the load decreases, a portion of the ports of the "large" switch can be turned off, and a portion of linecards within the "large" switch can also be turned off. The "large" switch can have no load at point 330, but there can still be energy being used to enable the "large" switch. This can be due to backplane energy required to keep the "large" switch turned on without current load passing through the "large" switch. The energy being used at point 330 can be approximately half the energy that is used by the same switch when the switch is at a particular energy (e.g., maximum energy).

At 326, the ideal energy proportionality line is shown. The ideal energy proportionality line 326 can represent a switch that uses a particular energy (e.g., maximum energy), when a load (e.g., maximum load) is passing through it. When no load is passing through the switch, as represented by line 326, the switch uses no energy 331.

Existing network architectures comprising of a single switch may not achieve energy proportionality due to an increased amount of energy required to enable the backplane of the switch. For example, when a switch is not in use, but is enabled to prepare for sudden future use, the switch can require increased energy. A network architecture (e.g., NoTS architecture, energy proportional network architecture) can allow for individual "tiny" switches to be disabled as traffic through the individual switches decreases. This technique of disabling individual switches while enabling other individual interconnected switches can allow a user to obtain increased energy proportionality.

For example, if a NoTS architecture is enabled and running at a threshold capacity (e.g., full capacity) in regards to the amount of traffic traveling through its switches, then the amount of energy required can also be at a threshold capacity (e.g., full capacity). At the threshold capacity (e.g., full capacity) the number of switches disabled can be zero. Individual switches can be disabled to conserve energy if the load decreases. For example, if a NoTS architecture is implemented in an office building, later in the day as workers start to leave, the load can decrease. At the time of this decrease, the NoTS architecture can start to turn off individual switches and/or ports. By turning off the individual switches, the energy required to enable the backplane of the switch is no longer be required, and an increased amount of energy can be conserved. Individual switches can be enabled and disabled based on the amount of traffic through the switches.

Figure 4:
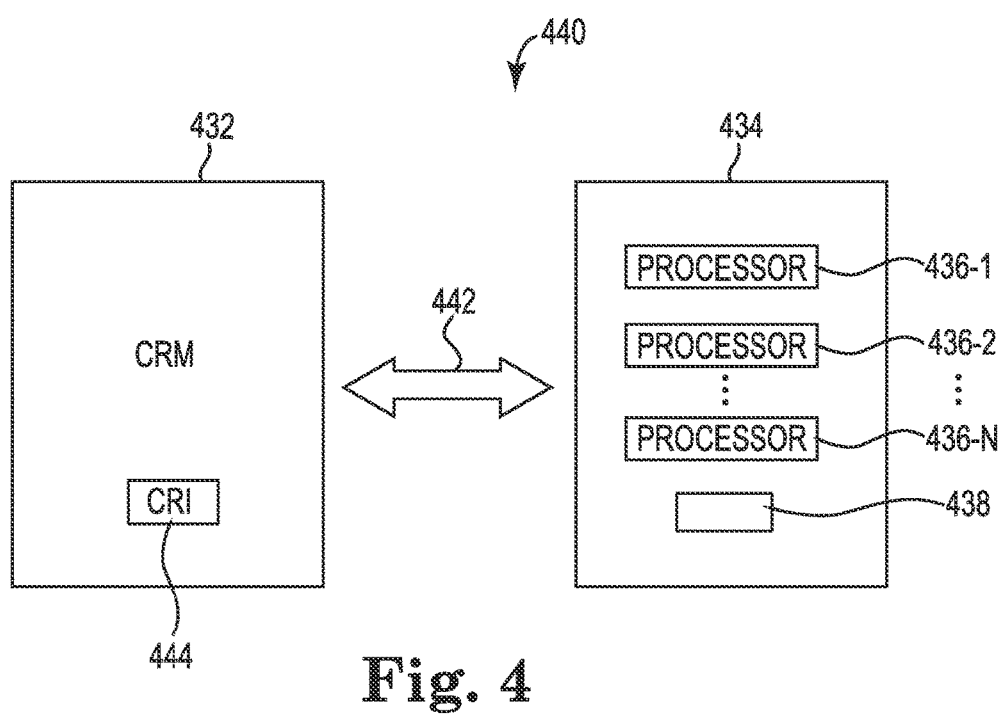
FIG. 4 illustrates a block diagram of an example of a computer-readable medium in communication with processing resources for implementing an energy proportional network architecture, according to the present disclosure.

FIG. 4 illustrates a block diagram 440 of an example of a computer-readable medium (CRM) 432 in communication with processing resources 436-1, 436-2, . . . , 436-N, for implementing an energy proportional network according to the present disclosure. CRM 432 can be in communication with a computing device 434 (e.g., JAVA application server, having processor resources of more or fewer than 436-1, 436-2, . . . , 436-N). The computing device 434 can be in communication with, and/or receive a tangible non-transitory CRM 432 storing a set of computer-readable instructions 444 executable by one or more of the processor resources 436-1, 436-2, . . . , 436-N, as described herein. The computing device 434 can include memory resources 438, and the processor resources 436-1, 436-2, . . . , 436-N can be coupled to the memory resources 438.

Processor resources 436-1, 436-2, . . . , 436-N can execute computer-readable instructions 444 that are stored on an internal or external non-transitory CRM 432. A non-transitory CRM (e.g., CRM 432), as used herein, can include volatile and/or non-volatile memory. Volatile memory can include memory that depends upon power to store information, such as various types of dynamic random access memory (DRAM), among others. Non-volatile memory can include memory that does not depend upon power to store information. Examples of non-volatile memory can include solid state media such as flash memory, EEPROM, phase change random access memory (PCRAM), magnetic memory such as a hard disk, tape drives, floppy disk, and/or tape memory, optical discs, digital versatile discs (DVD), Blu-ray discs (BD), compact discs (CD), and/or a solid state drive (SSD), flash memory, etc., as well as other types of computer-readable media.

The non-transitory CRM 432 can be integral, or communicatively coupled, to a computing device, in either in a wired or wireless manner. For example, the non-transitory CRM 432 can be an internal memory, a portable memory, a portable disk, or a memory associated with another computing resource (e.g., enabling the computer-readable instructions to be transferred and/or executed across a network such as the Internet).

The CRM 432 can be in communication with the processor resources 436-1, 436-2, ..., 436-N via a communication path 442. The communication path 442 can be local or remote to a machine (e.g., a computer) associated with the processor resources 436-1, 436-2, ..., 436-N. Examples of a local communication path 442 can include an electronic bus internal to a machine such as a computer where the CRM 432 is one of volatile, non-volatile, fixed, and/or removable storage medium in communication with the processor resources 436-1, 436-2, ..., 436-N via the electronic bus. Examples of such electronic buses can include Industry Standard Architecture (ISA), Peripheral Component Interconnect (PCI), Advanced Technology Attachment (ATA), Small Computer System Interface (SCSI), Universal Serial Bus (USB), among other types of electronic buses and variants thereof.

The communication path 442 can be such that the CRM 432 is remote from the processor resources e.g., 436-1, 436-2, ..., 436-N such as in the example of a network connection between the CRM 334 and the processor resources e.g., 436-1, 436-2, ..., 436-N. That is, the communication path 442 can be a network connection. Examples of such a network connection can include a local area network (LAN), a wide area network (WAN), a personal area network (PAN), and the Internet, among others. In such examples, the CRM 432 can be associated with a first computing device and the processor resources 436-1, 436-2 ... 436-N can be associated with a second computing device (e.g., a JAVA application server).

The processor resources 436-1, 436-2, ..., 436-N coupled to the memory 438 can receive a number of candidate existing network architectures. The processor resources 436-1, 436-2, ..., 436-N coupled to the memory 438 can also select one of the number of candidate existing network architectures based on a number of network criteria. The processor resources 436-1, 436-2, ..., 436-N coupled to the memory 438 can also calculate a number of switches for the energy proportional network architecture based on the number of network criteria. Furthermore, the processor resources 436-1, 436-2, ..., 436-N coupled to the memory 438 can identify a number of locations in the one of the number of candidate existing network architectures for the number of switches for the energy proportional network architecture based on the number of network criteria.

The above specification, examples and data provide a description of the method and applications, and use of the system and method of the present disclosure. Since many examples can be made without departing from the spirit and scope of the system and method of the present disclosure, this specification merely sets forth some of the many possible embodiment configurations and implementations.

What is claimed:

1. A method for arranging an energy proportional network architecture from desired network criteria, comprising:
    determining, by a computing device, a number of desired network criteria and a desired number of access ports;
    calculating, by the computing device, a particular number of network switches of a number of network switches utilized to process traffic flow for the energy proportional network architecture from the desired number of access ports and the number of desired network criteria, each network switch of the particular number of network switches comprising:
        a radix value of no greater than 10 access ports, wherein additional network switches that are extra to the particular number of network switches are independent of limitations on a number of access ports; and
        at least one power consuming component selected from a group of power consuming components consisting of: a dedicated processor, a dedicated power supply and a dedicated fan;
    arranging, by the computing device, the energy proportional network architecture using the number of network switches;
    powering, automatically by the computing device, the particular number of network switches of the number of network switches for a network including the energy proportional network architecture based on the traffic flow through the network; and
    disabling, automatically by the computing device and based upon the traffic flow through the network, the additional network switches, the disabling of the additional network switches comprising disabling each of the at least one power consuming component of each individual network switch of the additional network switches.

2. The method of claim 1, wherein the number of desired network criteria and the desired number of access ports comprise a number of network criteria and a number of access ports in an existing network architecture.

3. The method of claim 1, wherein determining the number of network criteria comprises:
    identifying a type of each of a number of network switches for the energy proportional network architecture;
    calculating a number of bandwidth criteria for the energy proportional network architecture; and
    determining a redundancy and a usage pattern for the energy proportional network architecture.

4. The method of claim 1, wherein determining the number of network criteria is done automatically utilizing a computer processor.

5. The method of claim 1, wherein the number of network switches of the energy proportional network architecture comprises a variety of types and radix values.

6. The method of claim 1, comprising eliminating a backplane of a portion of the number of network switches by disabling the portion of the number of network switches.

7. The method of claim 1, wherein the powering of the particular number of network switches and the disabling of the additional network switches is based upon a determined backplane energy consumption of each of the network switches of the larger set of network switches.

8. A non-transitory computer-readable medium storing a set of instructions executable by a processing resource to cause the processing resource to:
    receive an existing network architecture;
    determine a number of network criteria of the existing network architecture;
    identify a number of replacement locations of the existing network architecture based on the number of network criteria;
    calculate a first number of network switches utilized to process traffic flow through a network for an energy proportional network architecture to replace a second number of network switches of the existing network architecture at the number of replacement locations, the first number of network switches comprising:
        a particular number of network switches with a radix value of no greater than 10 access ports, wherein additional network switches of the first number of network switches that are extra to the particular number are independent of limitations on a number of access ports, and at least one power consuming component selected from a group of power consuming components consisting of: a dedicated processor, a dedicated power supply and a dedicated fan; and power the particular number of switches of the first number of network switches for the network including the energy proportional network architecture based on the traffic flow through the network; and disable, based upon the traffic flow through the network, the additional network switches of the first number of network switches, the disabling of the additional network switches comprising disabling each of the at least one power consuming component of each individual network switch of the additional network switches.

9. The non-transitory computer-readable medium of claim 8, wherein the number of network criteria comprises:
a type of each of a number of network switches of the existing network architecture;
a number of bandwidth criteria of the existing network architecture; and
a redundancy and a usage pattern of the existing network architecture.

10. The non-transitory computer-readable medium of claim 8, wherein there are fewer of the second number of network switches of the existing network architecture than the first number of network switches for the energy proportional network architecture.

11. The non-transitory computer-readable medium of claim 8, wherein the first number of network switches for the energy proportional network architecture contain a same number of access ports as the second number of network switches of the existing network architecture.

12. The non-transitory computer-readable medium of claim 8, wherein each of the particular number of network switches of the first number of network switches for the energy proportional network architecture includes 2 to 10 access ports.

13. The non-transitory computer readable medium of claim 8, wherein the powering of the particular number of network switches and the disabling of the additional network switches is based upon a determined backplane energy consumption of each of the network switches of the larger set of network switches.

14. The non-transitory computer readable medium of claim 8, wherein the instructions cause the processing resource to determine which network switches of the second number to replace with the first number of network switches based upon prior use of each of the network switches of the second number.

15. A computing system for arranging an energy proportional network architecture, comprising:
a memory; and
a processor resource coupled to the memory, to:
power a particular number of network switches of a larger set of network switches of a network based on traffic flow through the network, each network switch of the particular number of network switches comprising:
a radix value of no greater than 10 access ports, wherein additional network switches of the larger set of network switches that are extra to the particular number are independent of limitations on a number of access ports, and
at least one power consuming component selected from a group of power consuming components consisting of: a dedicated processor, a dedicated power supply and a dedicated fan; and
disable, based upon the traffic flow through the network, the additional network switches of the larger set of network switches of the network, the disabling of the additional network switches comprising disabling each of the at least one power consuming component of each individual network switch of the additional network switches.

16. The computing system of claim 15, wherein the number of network criteria comprises:
a type of each of a number of network switches of the existing network architecture;
a number of bandwidth criteria of the existing network architecture; and
a redundancy and a usage pattern of the existing network architecture.

17. The computing system of claim 15, wherein the number of network switches for the energy proportional network architecture is interconnected and performs as a single network switch.

18. The computing system of claim 15, wherein the number of candidate existing network architectures includes the number of network switches of the existing network architecture with a variety of radix values.

19. The computing system of claim 15, wherein the powering of the particular number of network switches and the disabling of the additional network switches is based upon a determined backplane energy consumption of each of the switches of the larger set of network switches.

* * * * *